US007739626B2

(12) United States Patent  
Jin et al.

(10) Patent No.: US 7,739,626 B2
(45) Date of Patent: Jun. 15, 2010

(54) METHOD AND APPARATUS FOR SMALL DIE LOW POWER SYSTEM-ON-CHIP DESIGN WITH INTELLIGENT POWER SUPPLY CHIP

(75) Inventors: Xuecheng Jin, Palo Alto, CA (US); Andrey B Malinin, Fort Collins, CO (US); John W. Kesterson, San Jose, CA (US)

(73) Assignee: iWatt Inc., Los Gatos, CA (US)

( * ) Notice: Subject to any disclaimer, the term of this patent is extended or adjusted under 35 U.S.C. 154(b) by 322 days.

(21) Appl. No.: 11/738,222

(22) Filed: Apr. 20, 2007

(65) Prior Publication Data

US 2008/0263482 A1    Oct. 23, 2008

(51) Int. Cl.
G06F 17/50      (2006.01)
(52) U.S. Cl. .............................................. 716/1; 716/4
(58) Field of Classification Search ........................ None
See application file for complete search history.

(56) References Cited

U.S. PATENT DOCUMENTS

| 5,021,684 | A  | * | 6/1991  | Ahuja et al. ................... 326/27 |
| 5,692,160 | A  |   | 11/1997 | Sarin |
| 6,204,651 | B1 | * | 3/2001  | Marcus et al. .............. 323/283 |
| 6,563,354 | B1 |   | 5/2003  | Jha |
| 6,774,710 | B2 | * | 8/2004  | Li .............................. 327/536 |
| 6,958,721 | B2 | * | 10/2005 | Vincent et al. .............. 341/157 |
| 7,051,306 | B2 | * | 5/2006  | Hoberman et al. ............. 716/6 |
| 7,161,513 | B2 | * | 1/2007  | Werner et al. ............... 341/119 |
| 7,246,027 | B2 | * | 7/2007  | May et al. ................... 702/130 |
| 7,278,119 | B2 | * | 10/2007 | Henson et al. ................. 716/2 |
| 7,286,003 | B2 | * | 10/2007 | Chatterjee et al. ........... 327/540 |
| 7,365,588 | B2 | * | 4/2008  | Nishikawa ................... 327/337 |
| 7,415,680 | B2 | * | 8/2008  | Hoberman et al. ............. 716/1 |
| 7,583,555 | B2 | * | 9/2009  | Kang et al. .................. 365/226 |
| 2002/0091948 | A1 |   | 7/2002  | Werner et al. |
| 2003/0057986 | A1 |   | 3/2003  | Amick et al. |
| 2005/0062482 | A1 |   | 3/2005  | Vincent et al. |
| 2005/0184786 | A1 |   | 8/2005  | Nishikawa |
| 2005/0218871 | A1 | * | 10/2005 | Kang et al. .................. 323/265 |
| 2006/0071703 | A1 |   | 4/2006  | Chatterjee et al. |
| 2006/0217920 | A1 |   | 9/2006  | May et al. |

OTHER PUBLICATIONS

Johnson, R. Colin, "Chip scheme saves power", EETimes, Nov. 13, 2006, 2 pgs.
Cole, Bernard, "ESC presenters address growing relability/processing concerns", EETimes, Mar. 7, 2002, 3 pgs.

(Continued)

*Primary Examiner*—Leigh Marie Garbowski
(74) *Attorney, Agent, or Firm*—Fenwick & West LLP

(57) ABSTRACT

A method and system of system-on-chip design that provides the benefits of reduced design time, a smaller die size, lower power consumption, and reduced costs in chip design and production. The process seeks to remove the worst performance and worst power case scenarios from the design and application phases. This is accomplished by planning the power supply voltage in the design phase along with its tolerance with process corner and temperature combinations. The established plan is then applied with communications between power supply integrated circuits and load system-on-chip.

7 Claims, 4 Drawing Sheets

Intelligent Power Enabled Platform

OTHER PUBLICATIONS

Saleh, et al., "Trends in Low Power Digital System-on-Chip Designs", International Symposium on Quality Electronic Design, 2002, 6 pgs.

Zaidi, Jauher, "Hardware/software design flows change", EETimes, Mar. 30, 1999. 3 pgs.

Goering, Richard, "Cadence rolls low-power design flow", EETimes, Jan. 29, 2007, 2 pgs.

PCT International Search Report and Written Opinion, PCT Application No. PCT/US2008/060368, Aug. 11, 2008, 7 pages.

PCT Preliminary Report on Patentability, PCT Application No. PCT/US2008/060368, Oct. 20, 2009, 6 pages.

* cited by examiner

Intelligent Power SOC Design Approach

Intelligent Power Enabled Platform

Intelligent Power Process Corner Sensor

Intelligent Power Process Corner + Temperature Sensor

METHOD AND APPARATUS FOR SMALL DIE LOW POWER SYSTEM-ON-CHIP DESIGN WITH INTELLIGENT POWER SUPPLY CHIP

FIELD OF INVENTION

This invention pertains to circuit design methodology relating to power consumption.

BACKGROUND

There are many factors to consider in SOC design. However the three most important constraints are the process corner, temperature, and power supply. The conventional SOC design methods use electronic design automation tools which assume a power supply voltage on certain combination or range of supply voltage while working with changing process corner and temperature parameters.

The power supply design is done independently from the SOC process corner and temperature design process. Without the integration of the power supply design, several problems arise in SOC production, including long circuit design times, large silicon area, high power consumption and high material and labor costs.

Additionally, this separate design approach gives rise to the worst-speed and worst-power cases. The worst-speed case or performance bottleneck occurs at the lowest supply voltage, highest temperature, and slowest process corner. From the worst-speed case the following problems arise: a lower supply voltage head room and slower transistor speed, a larger transistor W/L ratio is used to compensate, and a higher die cost. In the opposite scenario, the worst power case or power consumption bottleneck occurs at the point of the highest supply voltage, lowest temperature and fastest process corner. This case creates the following problems: a larger current from higher transistor speed and higher supply voltage, a higher thermal coefficient package or heat sink used, and a higher package cost.

Accordingly it is desirable to reduce the time, size, and cost of circuit design and eliminate the worst case scenarios or bottlenecks that appear in the design phase and during the shift to the application phase.

SUMMARY OF INVENTION

The invention is a new approach that serves to remove the worst cases from the load SOC design and application phases, by planning the intelligent power supply voltage and its tolerance with process corner and temperature combination. The established plan is then applied with communications between power supply integrated circuits and load system-on-chip.

Special case designs are created with the slowest process corner and highest supply voltage, or fastest process corner and lowest supply voltage. The approach then optimizes by choosing the best among special case and best/worst case designs. The power supply intelligence strategy is then planned accordingly.

Special sensors are used to monitor changes in the process corner and temperature. The process corner sensor uses a device speed detection circuit, such as a ring oscillator to register the process corner, an existing SOC crystal oscillator as an absolute time reference, a counter type multi-bit process corner indicator, and a process corner detection logic block to detect changes in the corner. To detect temperature fluctuations a sensor comprised of a bandgap type temperature to voltage converter and a comparator type multi-bit temperature indicator is used.

The invention results in improved design times, a smaller circuit footprint, lower power consumption, reduced costs, and the removal of the worst-case scenarios.

DETAILED DESCRIPTION OF PREFERRED EMBODIMENTS

Reference is made in detail to the preferred embodiments of the invention. While the invention is described in conjunction with the preferred embodiments, the invention is not intended to be limited by these preferred embodiments. On the contrary, the invention is intended to cover alternatives, modifications and equivalents, which may be included within the spirit and scope of the invention as defined by the appended claims. Furthermore, in the following detailed description of the invention, numerous specific details are set forth in order to provide a thorough understanding of the invention. However, the invention may be practiced without these specific details. In other instances, software or database applications, network systems, and electronic or optical circuits have not been described in detail so that aspects of the invention will not be obscured.

Figure 1:
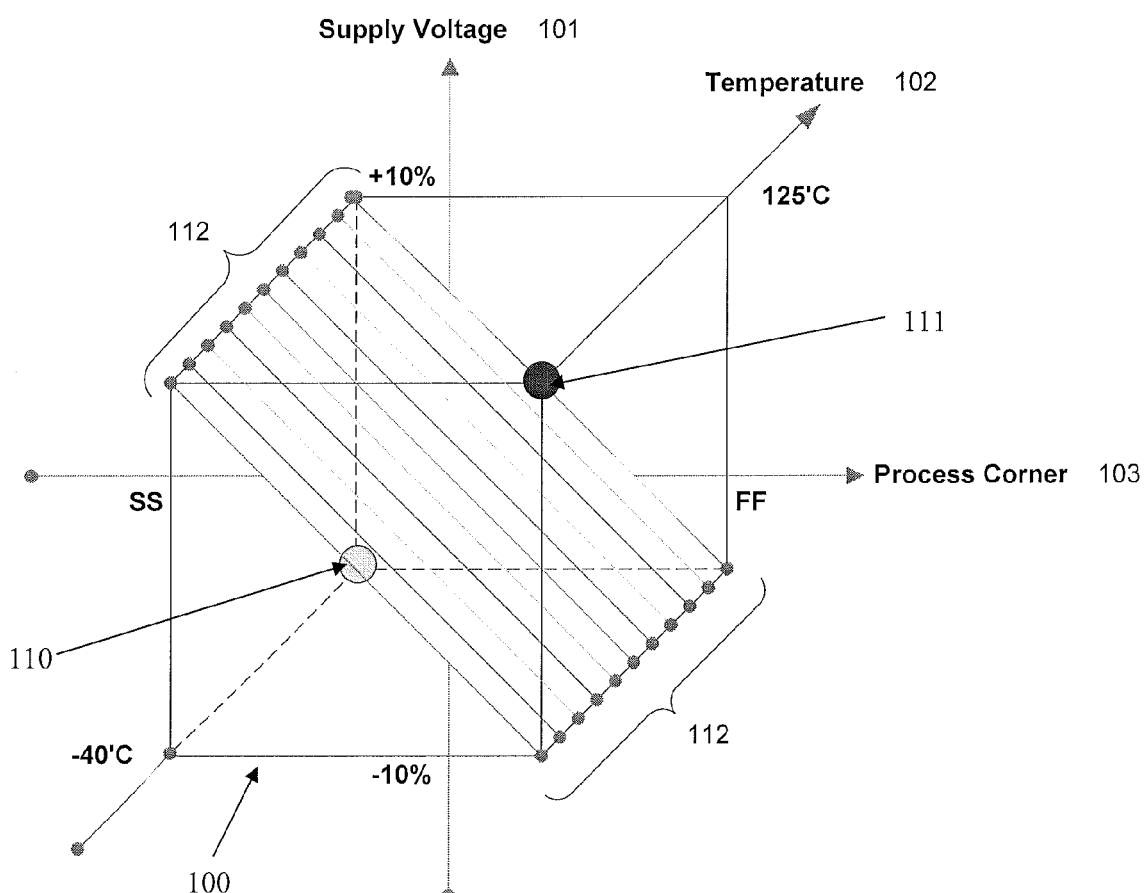
FIG. 1 is a diagram that illustrates the design corners of the intelligent power SOC design approach.

FIG. 1 is a simplified diagram that illustrates the design corners 100 of the intelligent power SOC design approach according to an embodiment of the current invention. The intelligent power design approach is initiated by having a limited die size with which to design an SOC. As more features are added, the SOC may exceed its allocated footprint using the traditional design flow, however utilizing the intelligent power approach results in a smaller die size, keeping the SOC within the limitations.

The design corners 100 encompass three parameters: supply voltage 101, temperature 102, and process corner 103. In addition, the design corners 100 comprise the worst case design 110, best case design 111, and special case designs 112.

The worst case design 110 occurs at a combination of the slowest process corner, lowest supply voltage, and highest temperature. While this design uses the least amount of power, it offers the worst performance in the design corner 100. This produces the result of a lower supply voltage head room and slower transistor speed, a larger transistor W/L ratio used to compensate for performance, and a higher die cost.

The best case design 111 occurs at a combination of the fastest process corner, highest supply voltage, and lowest temperature. While this design offers the best performance it has the highest power consumption. In addition, the design uses a larger current from faster transistor speed and higher supply voltage, a higher thermal coefficient package or heat sink is used, and a higher package cost results from choosing this design scenario.

The special case designs 112 are incorporated relatively linearly along the slant from the slowest process corner and highest supply voltage to the fastest process corner and lowest supply voltage. The designs work at a variety of temperatures, effectively limiting the 3-dimensional model to 2-dimensions, process corner and supply voltage. These designs emerge when planning the power supply voltage value and its tolerance with the process corner and temperature combinations.

During the design process, intelligent power optimization occurs by comparing the worst case 110, best case 111, and special case 112 designs. The process then chooses the best design for the scenario. A power supply intelligence strategy is planned according to the chosen design and implemented. This strategy ensures that the SOC has guaranteed performance across process corner and temperature variations without large design margins, resulting in a smaller die area and lower power consumption.

Figure 2:
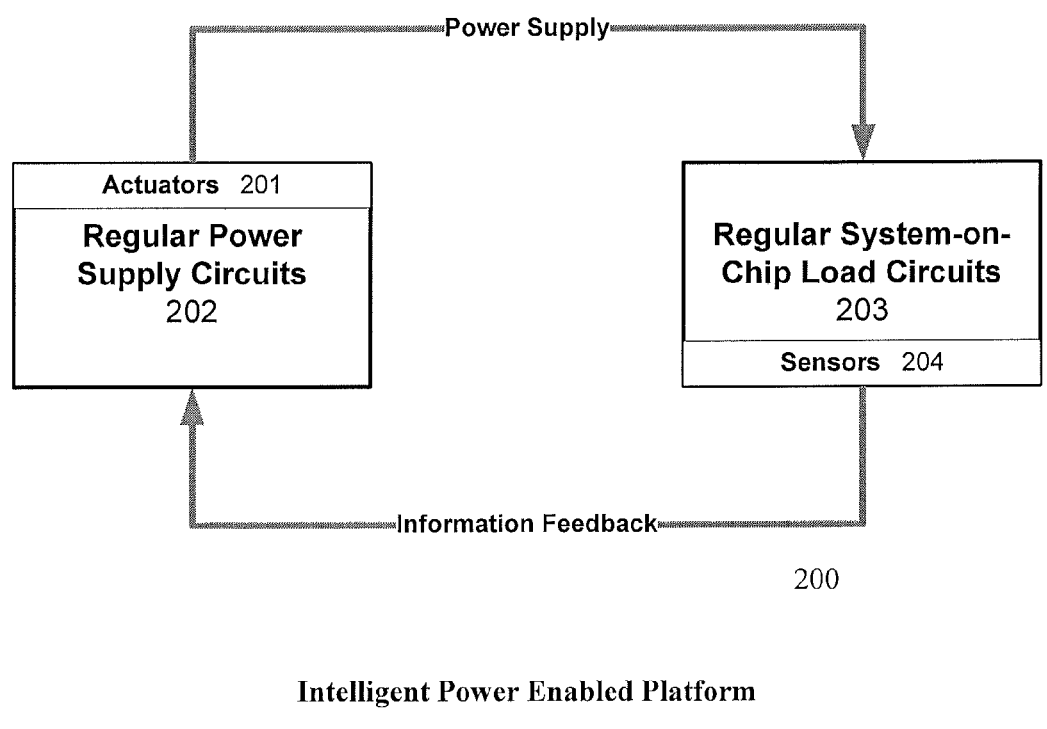
FIG. 2 is a diagram that illustrates the preferred embodiment of the intelligent power enabled platform.

FIG. 2 illustrates an embodiment of an intelligent power enabled platform 200. The platform 200 comprises regular power supply circuits 202, actuators 201, regular SOC load circuits 203, and sensors 204. The power supply circuits 202 may be coupled to a plurality of actuators 201 for controlling voltage according to changes sensed in the process corner and temperature. The actuators 201 implement the power supply intelligence strategy chosen from the design process and provide the power supply to the load circuits 203 accordingly. The SOC load circuits 203 are coupled with a plurality of sensors 204 which provide information feedback to the actuators 201 that adjust the power supply according to the designed power supply intelligence strategy. The information may include process corner, temperature, supply voltage, load dynamics, load bandwidth, load operation sequence, load power saving mode changes, load power down or power up sequences, load self protection, etc. Additionally, the platform 200 can be composed of an SOC with a separate power supply or an integrated system comprising system-in-package (SIP), multi-chip-modules (MCM), or monolithic integration of power supply and load SOC circuits. In the integrated environment, the communication between SOC circuits and power supply circuits may be customized without following any standards for best performance and application optimization.

In accordance with an important aspect of the present invention, an actuator for a separate or integrated power supply circuit comprises process corner and temperature performance capability along with special optimization and trade-off consideration. The process corner performance capability allows the device to adjust the supply voltage depending on the speed of the process coiner. When a fast speed process corner is registered to the load SOC, a lower supply voltage is actuated. Alternatively, when a slow speed process corner is sensed in the load SOC, the actuator supplies a higher voltage. Similarly, temperature performance actuator capabilities allow a lower supply voltage at low temperatures and a higher supply voltage at high temperatures. Meanwhile, the special optimization and trade-off considerations comprise: power supply voltage optimization for thermal protection, transistor process corner based optimization for digital circuits, and resistor/capacitor process corner based optimization for analog circuits.

Figure 3:
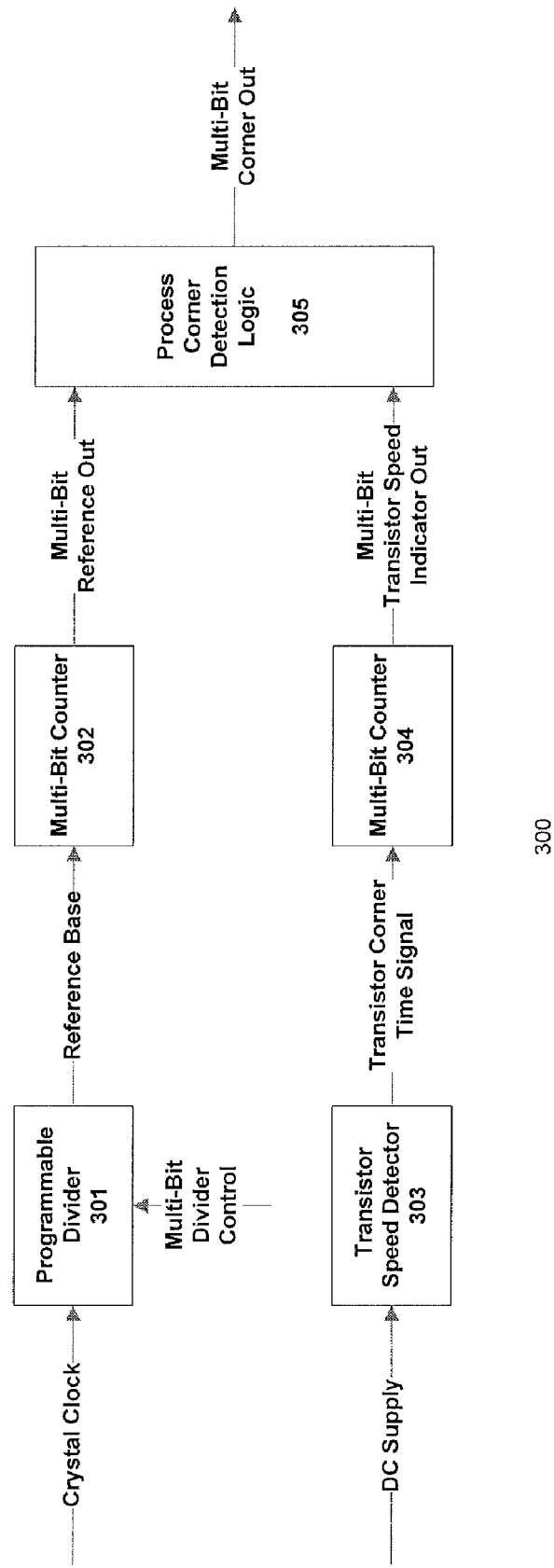
FIG. 3 is a diagram that illustrates the preferred embodiment of the intelligent power process corner sensor.

FIG. 3 diagram illustrates a process corner sensor 300 for a SOC according to an embodiment of the current invention. The sensor monitors the process corner of the load SOC and provides information feedback to the actuators. The sensor 300 comprises a programmable divider 301, a first multi-bit counter 302, a transistor speed detector 303, a second multi-bit counter 304, and a process corner detection logic block 305. The sensor 300 uses the detector 303 to register the process corner, with the help from an absolute time reference from a crystal clock.

The divider 301 takes input from a crystal clock and a multi-bit divider control. The inputs are then processed and output in the form of a multi-bit reference base. The base is processed by the first counter 302 and output as a multi-bit reference out. The detector 303 operates on a DC power supply and outputs a process corner sensing clock. The second counter 304 receives the clock and outputs a multi-bit transistor speed indicator out. The process corner detection logic block 305 receives both the reference out and transistor speed indicator out and outputs a multi-bit transistor corner out. The components of the sensor 300 can be directly connected or indirectly connected though such means as a wired bus, optical interconnects, inductive coupling, or other functionally equivalent connection functionality.

In an example of an embodiment of the invention the divider 301 receives input from a crystal clock operating within the range of 3 to 65 MHz and a 6-bit divider control. The divider 301 processes the inputs and produces a 1 MHz reference base. The first 8-bit counter 302 processes the base and outputs an 8-bit reference out. The detector 303 being a ring oscillator operating at 1 MHz provides the transistor corner time signal to the second 8-bit divider 304 thereby producing an 8-bit transistor speed indicator out. The process corner detection logic block 305 receives both the 8-bit reference out and 8-bit transistor speed indicator out and processes them into an 8-bit transistor corner out.

An alternative embodiment of the invention for use with analog circuits would further include a resistor capacitor speed detector powered by a DC power supply to produce a resistor capacitor corner time signal. Said signal is received by a third multi-bit counter which processes the signal into a multi-bit resistor capacitor speed indicator out. The process corner detection logic block 305 receives the resistor capacitor speed indicator out along with the reference out and transistor speed indicator out. Upon processing the input, a multi-bit transistor corner out and multi-bit resistor capacitor corner out are produced. The components for the embodiment can be directly connected or indirectly connected through such means as a wired bus, optical interconnects, inductive coupling, or other functionally equivalent connection functionality.

Figure 4:
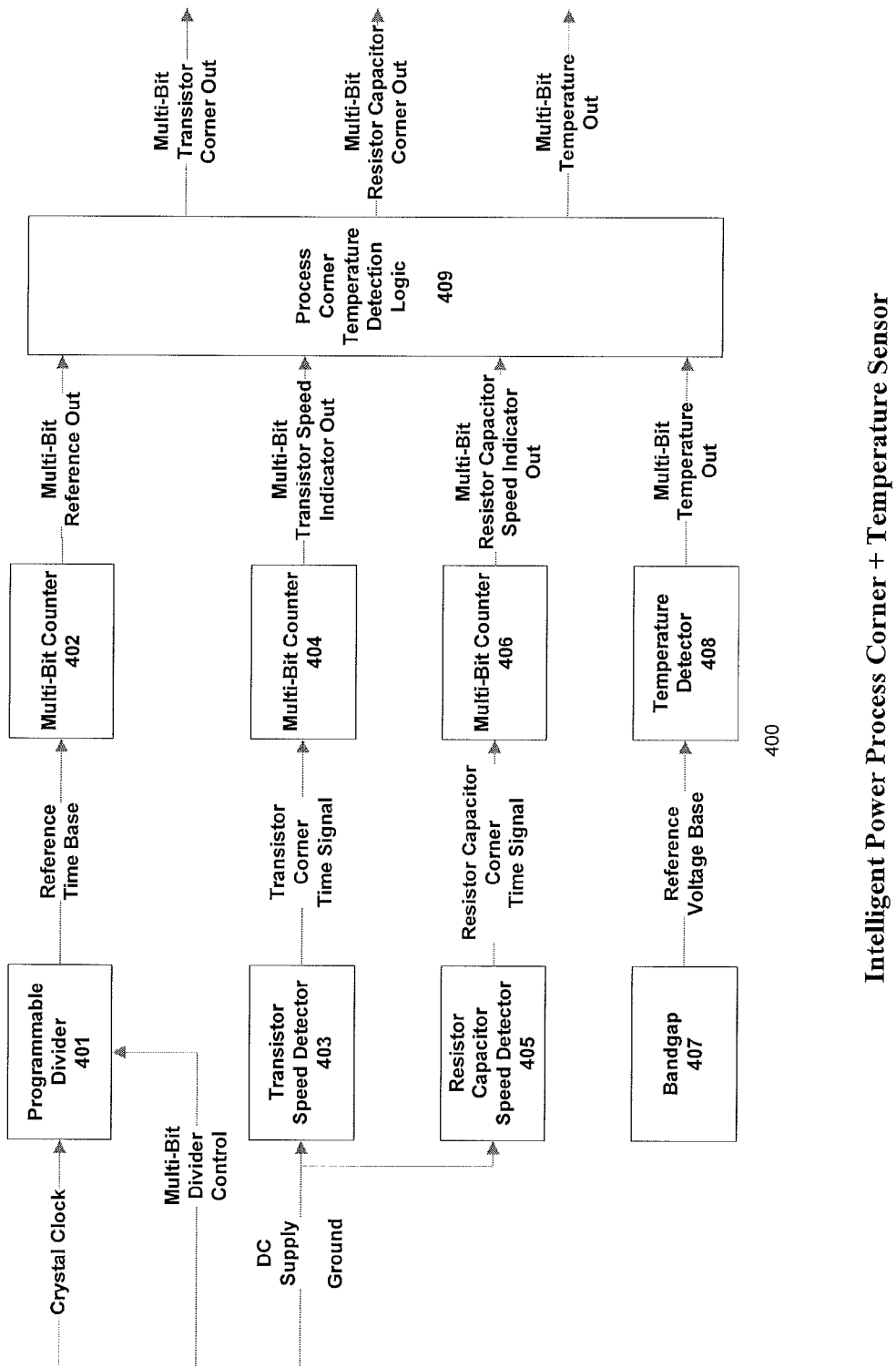
FIG. 4 is a diagram that illustrates the preferred embodiment of the intelligent power integrated process corner and temperature sensor.

FIG. 4 illustrates an integrated process corner and temperature sensor 400 in an alternate embodiment of the invention. The sensor monitors the process corner and temperature of the load SOC and provides information feedback to the actuators. The integrated sensor 400 comprises: a programmable divider 401, a first multi-bit counter 402, a transistor speed detector 403, a second multi-bit counter 404, a resistor capacitor speed detector 405, a third multi-bit counter 406, a bandgap 407, a temperature detector 408, and a process corner temperature detection logic block 409.

The divider 401 takes input from a crystal clock and a multi-bit divider control. The inputs are then processed and output in the form of a multi-bit reference base. This base is processed by the first counter 402 and output as a multi-bit reference out. The transistor speed detector 403 operates on a DC power supply and produces a transistor corner time signal. The second counter 404 receives the signal and outputs a multi-bit transistor speed indicator out. The resistor capacitor speed detector 405 operates on the same DC power supply and produces a resistor capacitor corner time signal which is received by the third counter 406. The counter 406 processes the signal and outputs a multi-bit resistor capacitor speed indicator out. The resistor capacitor speed detector 405 and accompanying counter 406 is used in the measurement of analog circuits and may be optional for digital circuit design. The bandgap 407 comprises a bandgap type temperature to voltage converter that produces a reference voltage base. Said base is received by the detector 408 which comprises a comparator type temperature indicator and outputs a multi-bit temperature out. The process corner detection logic block 409 receives the reference out, transistor speed indicator out, resistor capacitor speed indicator out and the temperature out. Upon processing the data the block issues a multi bit transistor corner out, a multi-bit resistor capacitor corner out, and a multi-bit temperature out. The components of the sensor 400 can be directly connected or indirectly connected though such means as a wired bus, optical interconnects, inductive coupling, or other functionally equivalent connection functionality.

Optionally, the crystal clock operates on a setting within the range of 1 to 65 MHz and the divider control comprises 6-bits. The first 402, second 404, and third 406 counters being 8-bit counters with respective 8-bit reference and speed outputs. Similarly, the temperature detector 408 produces an 8-bit temperature out. The process corner temperature detection logic block 409 receives the four 8-bit inputs and produces an 8-bit transistor corner out, an 8-bit resistor capacitor corner out, and an 8-bit temperature out.

While the intelligent power technology and concepts have been shown with the parameters of process corner, temperature, and power supply voltage, they can be extended beyond the aforementioned limits. Examples of additional parameters include load dynamics, load bandwidth, load operation sequence, load power saving mode changes, load power down or power up sequences, load self protection, etc.

Additionally, the intelligent power SOC digital design flow can be implemented by cell-based design to be used with a standard cell library. The standard cell library may be comprised of cells containing the following characteristics: the supply voltage associated with a slow process corner can be higher than or equal to the supply voltage associated with a fast process corner. Optionally, the library may also have to qualify for the special case combinations of supply voltage, process corner, and temperature.

In another embodiment of the invention, the intelligent power SOC digital design flow may also be incorporated into a electronic design automation (EDA) environment executed by a controller, which is one or more processor, server, computer or other functionally equivalent controller functionality. The incorporation would be in the form of a dynamic rule checker, or similar method, which flags on unconventional design conditions of process corner, temperature, and supply voltage combinations. Allowing the user to redesign the circuit based on the intelligent power design method, resulting in a noticeable reduction of silicon area and power consumption. In addition the design flow provides a favorable thermal coefficient selection for the SOC package design resulting in a lower package cost.

Alternatively, the intelligent power design flow may be applied to analog circuit design. The analog integrated circuit design flow may be incorporated into a electronic design automation (EDA) environment executed by a controller, which is one or more processor, server, computer or other functionally equivalent controller functionality. The incorporation would be in the form of a dynamic rule checker, or similar method, which flags on unconventional design conditions of process corner, temperature, and supply voltage combinations. Allowing the user to redesign the circuit based on the intelligent power design method, resulting in a noticeable reduction of silicon area and power consumption. Additional results are a significant W/L ratio reduction when higher supply voltage is unconventionally associated with slow process corner and high temperature. This leads to a significant analog core layout area reduction due to the unconventional combination. In addition the design flow provides a favorable thermal coefficient selection for the SOC package design resulting in a lower package cost.

An example of the unconventional design combination that may be flagged by the dynamic rule checker can occur when the supply voltage associated with the slow process corner can be higher than or equal to the supply voltage associated with the fast process corner. The flagging may additionally notify the user of a more optimum design condition, such as the intelligent power design method, that produce notable benefits.

In an application of the invention, the intelligent power design flow is encompassed in an intelligent power technology process corner indicator and power indicator. In the process corner indicator, the statistical spread of the process corner may result such that every individual load SOC have a different power supply voltage based on the different feedback information provided. The power indicator results in similar SOC load power consumption values among many SOC load regardless of the process corner variation due to iPower information feedback.

The embodiments were chosen and described in order to explain the principles and the application of the invention, thereby enabling others skilled in the art to utilize the invention in its various embodiments and modifications according to the particular purpose contemplated. The scope of the invention is intended to be defined by the claims appended hereto and their equivalents.

What is claimed is:

1. A system of cost sensitive die and package design comprising:
    an SOC load circuit;
    a plurality of sensors coupled to the SOC load circuit for providing information feedback;
    a power supply circuit;
    a temperature reference coupled to at least one of the plurality of sensors; and
    a plurality of actuators coupled to said power supply circuit receiving the information feedback and regulating the power supply circuit according to a power supply intelligence strategy, wherein the temperature reference helps the plurality of sensors coupled to the SOC load circuit provide information feedback to the actuators regulating the power supply circuit according to the power supply intelligence strategy enabling cost sensitive die and package design.

2. The system of claim 1 wherein:
the sensors monitor process corner or temperature.

3. The system of claim 1 wherein:
the system is integrated in a system-in-package format.

4. The system of claim 1 wherein:
the system is integrated in a multi-chip-module format.

5. The system of claim 1 wherein:
the system is monolithically integrated.

6. The system of claim 1 wherein:
the system is comprised of at least two separate chips.

7. The system of claim 1 wherein:
the temperature reference is comprised of a bandgap type temperature reference.

* * * * *